Jan. 6, 1953            G. J. PERLOW ET AL            2,624,778
ELECTRONIC FLUXMETER AND ALTERNATING CURRENT AMPLIFIER
Filed Oct. 25, 1945
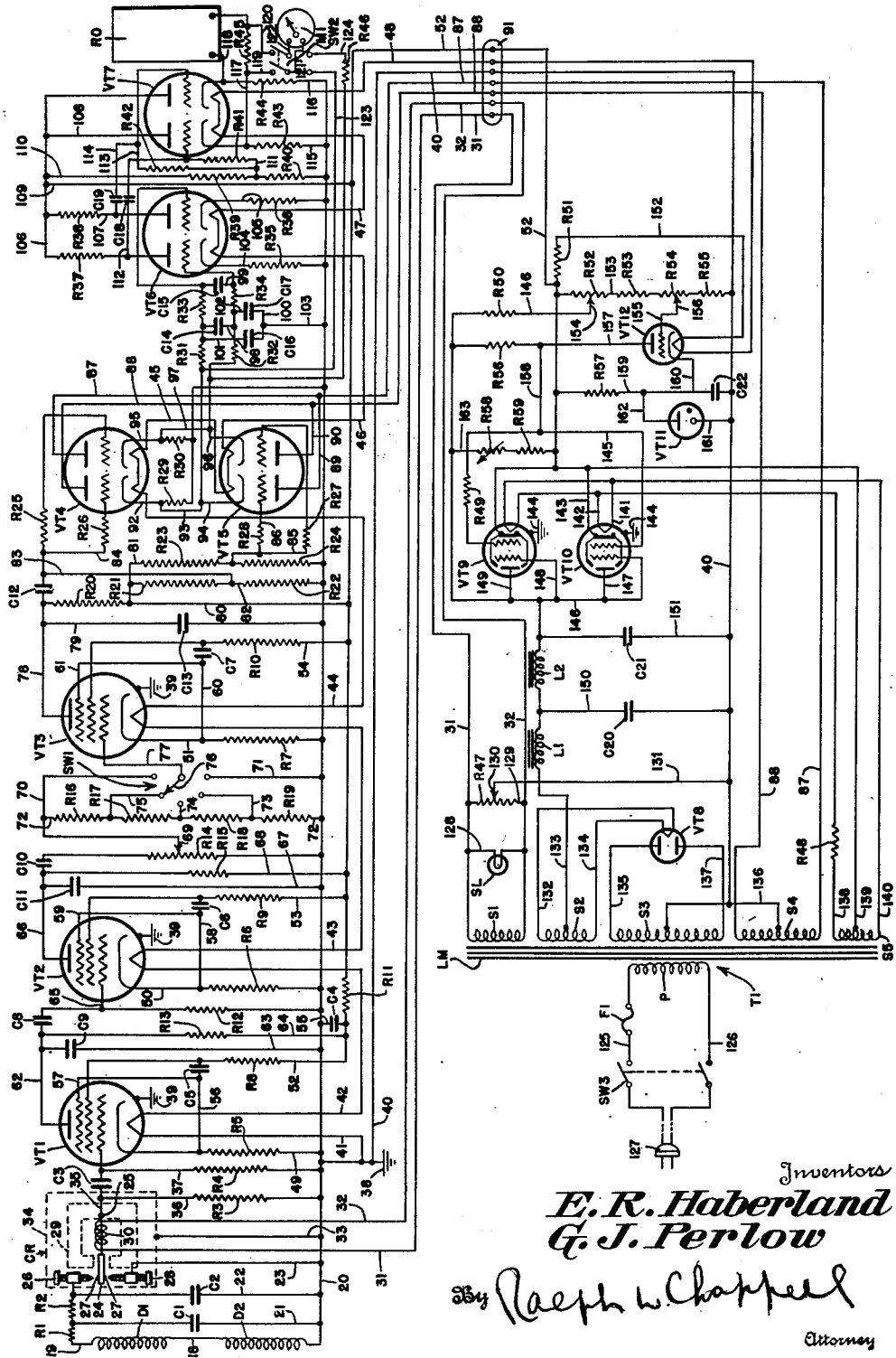
Inventors
E. R. Haberland
G. J. Perlow
By Ralph W. Chappell
Attorney Patented Jan. 6, 1953

2,624,778

UNITED STATES PATENT OFFICE 2,624,778

ELECTRONIC FLUXMETER AND ALTERNATING CURRENT AMPLIFIER

Gilbert J. Perlow and Ernest R. Haberland, Washington, D. C.

Application October 25, 1945, Serial No. 624,620

16 Claims. (Cl. 175—182)

(Granted under Title 35, U. S. Code (1952), sec. 266)

This invention relates to an electronic fluxmeter including an alternating current amplifier for use particularly with magnetic location equipment, primarily the type of magnetic location equipment used for determining the presence of sunken metallic masses, such as depth charges, mines, submarines or torpedoes, on the bed of a body of water.

The invention comprises generally a detecting device, which may be a pair of differentially wound detector or search coils, an input filter, an interrupter or chopper for interrupting the signal, an A. C. amplifier, a lock-in amplifier, a meter driving stage, a recorder for recording the signal picked up by the detector coils, and a suitable power supply for the various components.

The invention employs the principle, well known in the art, that the magnetic field of the earth, while normally highly uniform for a given area of the earth's surface, is distorted by the presence of a metallic mass. When a detector comprising a pair of similar coils, connected in series opposition and spaced apart a predetermined distance with their axes in alignment, are moved in a uniform field no useful signal is developed thereacross, but when a distorted field is traversed, however, the instantaneous voltage generated in one coil will exceed that generated by the other for the reason that the flux linkages of the coils are unequal, and a signal potential difference will be developed across the two coils, the characteristics of the signal being determined by the usual factors which govern electromagnetic circuits. Such an arrangement of coils provides a simple gradiometer responsive to changes in the strength of the earth's field, the signal resulting from unbalance of the two voltages in the coils varying in amplitude and time period in accordance with the degree and extent of the distortion of the earth's field, and the speed of movement of the coils.

The apparatus of the instant invention is particularly adapted for use on a vessel for the detection and location of underwater objects, in which the aforementioned detector coils are towed by the vessel. As is well known, the frequency or time period of the voltage generated by a towed coil which traverses a magnetic field is determined by the rate of motion of the coil, and it is accordingly understood that the time period of the useful signal voltage generated by the detector coils of the instant invention will depend largely upon the speed of the towing vessel and to some extent upon the size and permeability of the metallic object the presence of which causes distortion of the earth's field. In the embodiment to be herein described, the useful signal voltage generated by the detector coils will be of low frequency and will have a time period of, for example, fifteen seconds, when the coils are towed at normal vessel speeds, in accordance with the overall sensitivity of the apparatus as determined by the size and spacing of the coils, and the gradient of the earth's field at the coils as determined by the magnitude of the distortion. When the apparatus of the instant invention is employed for locating mines and sunken torpedoes, the distortion of the earth's field is of a low order. In order to amplify the signal, the aforementioned chopper is provided for producing an A.-C. voltage having a component corresponding to the useful signal generated by the detector coils. After suitable amplification, the A.-C. voltage is rectified or demodulated and the signal component applied to flux measuring apparatus adapted to measure and record changes in the amplitude and time period of the signal.

Because the apparatus of the instant invention is particularly adapted for detecting underwater objects and is adapted to be towed by a vessel, as would be expected the detector coils are subjected to the nonuniform electromagnetic fields generated by the vessel itself. The most important of these is likely to be of the same frequency as the A.-C. power generator or lighting system of the vessel, and is usually 60 C. P. S. This field is undesirable for the reason that it causes the generation of an unwanted 60 cycle component in the voltage generated by the detector coils. In the instant invention, this 60 cycle component is largely eliminated by a low pass filter connected between the detector coils and the aforementioned chopper which converts the low frequency useful signal into an A.-C. voltage which may be easily amplified by conventional apparatus.

The detector coils of the instant invention, in order to permit towing thereof beneath the surface of the body of water, are preferably enclosed within a suitable watertight enclosure. It is almost impossible, however, to prevent some moisture from reaching the coils. This moisture is responsible for the generation of small D.-C. potentials due to thermoelectric effects resulting from contacts between two dissimilar metals, and for other reasons. These voltages are generally referred to as "sea battery E. M. F.'s," and are undesirable in that they cause a D.-C. component in the voltage generated by the detector apparatus including the coils. The instant invention provides a circuit arrangement for eliminating this component and preventing it from influencing the flux measuring device.

Other undesirable components are also generated in the voltage produced at the detector, for example, a voltage produced by heading changes of the vessel, which may have a time period of, for example, 120 seconds, and a voltage produced by roll, which may have a time cycle of five seconds. These voltages, in the absence of a useful signal, may cause spurious signal voltages to be applied to the amplifier. The instant invention also provides means for eliminating these components or spurious signals and preventing them from influencing the flux measuring and indicating device.

An object of the present invention is to provide an electronic fluxmeter having accurate flux measuring properties and that is both rugged and sensitive.

Another object of the present invention is to provide an electronic fluxmeter having high input impedance to match the impedance of the sensitive detector search coils.

A further object is to provide an electronic fluxmeter utilizing a novel scheme of interruption, or chopping of the input signal received from the search coils, the interrupter or chopper having high input impedance and consequently high power sensitivity.

An additional object is to provide an electronic fluxmeter having an input filter which will discriminate against transient electromotive forces, particularly of the common sixty (60) cycle power frequency.

It is likewise an object of the present invention to provide an electronic fluxmeter utilizing an interrupter or chopper in which novel means is provided for adjusting the contacts whereby both contacts and the vibrator cannot be simultaneously shorted and the output capacitor in the input filter thereby discharged.

It is another object of the present invention to provide an electronic fluxmeter having an A.-C. amplifier after the interrupter or chopper which amplifier is tuned by coupling capacitors and plate by-pass capacitors, which form of tuning reduces the pick-up voltage peak while the vibrator of the chopper is floating, reduces the potential on the grids of the lock-in stage of the amplifier, and also reduces the possibility of overloading the lock-in amplifier.

It is an additional object of the present invention to provide an electronic fluxmeter having a lock-in amplifier stage, which stage provides a polarity distinguishing circuit for the input signal and serves as a sharp filter to discriminate against amplifier noises and stray pick-up voltages in the detector coils.

It is another object to prevent potential unbalance in the output of the lock-in stage in response to asymmetrical voltages applied to the input thereof.

It is a further object of the present invention to provide an electronic fluxmeter having an amplifier with a buffer amplifier stage therein, which stage permits the use of both an integration circuit and a capacity coupling circuit to eliminate the effects of background and slow drift in the input of the amplifier due to thermal and sea battery E. M. F.'s applied thereto.

A still further object of the invention is to provide an electronic fluxmeter having a power supply in which direct current is supplied to the heaters of the vacuum tubes in the first two amplifier stages.

Still other objects, advantages and improvements will be apparent from the following description, taken in connection with the accompanying drawing, in which:

There is shown in the upper half of the single figure a pair of gradiometer detector coils, the input filter, interrupter or chopper, A. C. amplifier, lock-in amplifier stage, buffer amplifier stage, meter driving stage, and the recorder, and in the lower half of this figure there is shown the power supply.

Referring now in particular to the single figure of the drawings, there is shown ahead of the A. C. amplifier the gradiometer detector coils, the input filter circuit, the chopper, and the coupling circuit. Heretofore detector coils having large turns-area products (about 30,000 to 40,000 square feet turns) have been used on vessels for the location of submerged metallic masses, such as depth charges, mines, torpedoes, submarines or sunken vessels. On vessels of the destroyer size or larger, the space used by such a large turns-area presents no problem but on smaller craft such a large space is not available.

The detector of the instant invention consists generally of two coils, here designated as D-1 and D-2 respectively, of a very large number of turns of very fine wire in a small area, for instance one and a half square feet, these coils being enclosed by caps of brass, or other suitable diamagnetic material, and mounted on either end of an elongated tube (not shown), also of suitable diamagnetic material, this tube being from five (5) to ten (10) feet in length. The two coils are connected in series opposition by a conductor 18 which passes through the elongated supporting tube. The gradiometer detector device is towed through the water by a small vessel, such as a trawler, to which it is connected by two cables, one a towing cable and the other a transmission cable. The total impedance of the two coils of the gradiometer detector device is of course quite large and, under the well known condition for maximum energy transfer, the impedance of the receiver circuit should be of substantially the same value. The chopper and A. C. amplifier of the present invention having high input impedance and voltage sensitivity were developed to meet this need.

The gradiometer detector coils D-1 and D-2 are connected by conductors 19 and 20—23, respectively, to the fixed contacts 26 and 28 of the chopper CR, to be later described. These coils are subject to rapidly fluctuating fields produced by the towing vessel. As aforementioned, these fields, one of which is usually fluctuating at the frequency of the power supply of the vessel, usually 60 C. P. S., induce undesired voltages in the coils, so that an input filter is employed interconnected between the detector coils and the chopper for eliminating these components from the voltage applied to the chopper. An ideal input filter would have an infinite discrimination against any alternating potential above the signal frequency. Since an ideal filter is not practical, a compromise must be made. As the largest percentage of the undesirable frequency is likely to be sixty (60) cycles because of the wide use of this frequency for the vessel's auxiliary power, this frequency should be discriminated against as much as possible. Due to the aforementioned high impedance of the gradiometer detector coils D-1 and D-2, it is permissible to have high impedance in the input circuit and hence an R-C filter can be used.

As shown, the R–C filter consists of two resistors R–1 and R–2 in series in the conductor 19, intermediate the gradiometer detector coil D–1 and the fixed contact 26 of the chopper CR, and two capacitors C–1 and C–2, the former being bridged by a conductor 21 across the conductor 19, intermediate the resistors R–1 and R–2, and the conductor 20, and the latter being bridged by a conductor 22 across the conductor 19, intermediate the resistor R–2 and the chopper contact 26, and the conductor 20. With the gradiometer detector coils D–1 and D–2 having inductances of between 300 and 400 henries each, values of 100,000 ohms for the resistors R–1 and R–2 and 8 microfarads for the capacitors C–1 and C–2 have been found satisfactory in eliminating the component of voltage due to A. C. pick-up from the power supply of the vessel.

The chopper CR is shown schematically on the drawing. This chopper may be a standard commercial device modified for high impedance use in accordance with the copending application of Ernest R. Haberland, entitled "Chopper for Electrical Circuits," Serial No. 604,942, filed July 13, 1945, now Patent No. 2,479,566. As shown on the drawing the chopper consists of a vibrator 24 mounted at one end at 25 and carrying contacts 27—27 on either side adjacent the free end. The respective contacts 27 are adapted to abut an adjustable fixed contact 26 at one end and a complementary adjustable fixed contact 28 at the other end of the arc of oscillation. The fixed contacts 26 and 28 are adjustable by two screws which position them with respect to the two movable contacts 27—27. The values of the adjustments are expressed in percentage of the period of vibration. The adjustment between the vibrator 24 and either fixed contact 26 or 28 is forty-eight per cent (48%); the vibrator floats four per cent (4%) of the period of vibration. This float time is essential in the present arrangement for, if the chopper contacts were so arranged that they could all be electrically connected together at any instant of operation, such a three way connection would put a short circuit across the output capacitor C–2 of the input filter circuit thus discharging this capacitor, which latter could not be recharged rapidly enough because of the high impedance of the input filter circuit.

The vibrator 24 is positioned so as to sweep past the gap of a C-shaped permanent magnet 29, this magnet preferably being made of the magnetic alloy known commercially as "Alnico." An exciter coil 30 surrounds the vibrator 24 and this exciter coil is connected to the power supply by conductors 31 and 32 for energizing the coil with a 60 C. P. S. current. It will readily be seen that if alternating current is passed through the exciter coil 30, the free end of the vibrator 24 will be magnetized so as to have the polarity thereof successively reversed and the vibrator will be alternately attracted and repelled by the poles of the permanent magnet 29. The chopper CR is enclosed by a metal casing 34 (indicated in dotted lines on the drawing) which casing is connected to the grounded conductor 20 by a conductor 33. A ground 38 is placed on the conductor 20 adjacent the juncture of the conductors 33 and 20.

A coupling circuit is provided intermediate the chopper and the A. C. amplifier, as is also shown on the drawing. A conductor 35 is connected to the vibrator 24 at the pivotal mounting 25 of the latter and this conductor extends to the control grid of the first stage vacuum tube VT–1. A blocking capacitor C–3 is interposed in the conductor 35 thereby to prevent current from the chopper from flowing in the grid circuit of the tube VT–1. A conductor 36 is bridged from the connection of the conductor 35 to the vibrator 24 at the mounting 25 of the latter, to the grounded conductor 20. A resistor R–3 is interposed in this conductor and is employed to hold the potential of the vibrator at ground potential when no signal is being received from the detector coils D–1 and D–2. Similarly, a conductor 37 is bridged from the conductor 35, intermediate the capacitor C–3 and the control grid of the first stage vacuum tube VT–1, and the conductor 20. A resistor R–4 is interposed in this conductor and operates as a grid leak for the first stage vacuum tube VT–1. Values of one tenth (0.10) microfarad for the capacitor C–3 and one (1) megohm for the resistors R–3 and R–4 respectively have been found satisfactory.

The A. C. amplifier consists of three (3) stages each containing a pentode type vacuum tube, designated VT–1, VT–2 and VT–3. The vacuum tube designated commercially as the "12SJ7" has been found satisfactory for the instant purpose. This is a metal encased tube with five (5) elements, the heater-cathode, control grid, screen grid, suppressor grid, and a plate. The metal casing of each tube is grounded at 39. Because of the high amplification necessary in the instant apparatus the heaters of the tubes in the first two stages have to be operated on direct current. It is necessary that the operating current for the heaters of these tubes be stabilized in order to eliminate signals that would otherwise be produced by rapidly fluctating heater voltage. Beyond the second stage, however, it is not necessary that the heaters of the other tubes be operated on direct current. Nevertheless, for practical reasons, the heaters of the three (3) tubes of the A. C. amplifier, the tube VT–4 of the lock-in amplifier, the bucking tube VT–5 for the lock-in amplifier, and the two (2) tubes VT–6 and VT–7 comprising the buffer amplifier stage and the meter driving stage respectively are all operated on direct current. Since a low potential regulated source of direct current is not conveniently provided from a rectifier circuit, it is desirable to use high potential heater tubes and to supply the heater current of all of the tubes from the high potential used to supply the plates. A series resistance R–51 is employed to take up the difference of potential between the plate supply potential and that required by the tubes; hence the regulator tube VT–11 of the power supply is included in the D. C. heater supply system.

A conductor 40 is connected to the conductor 20 at the juncture of the latter with the ground connection 38 and the conductor 40 extends to the power supply. A second conductor 41 is also connected to the conductor 20 at the juncture of the latter with the ground connection 38 and the conductor 40, and the conductor 41 extends to one side of the heater of the first stage vacuum tube VT–1; a conductor 42 extends from the other side of the heater of the vacuum tube VT–1 to one side of the heater of the second stage vacuum tube VT–2; a conductor 43 extends from the other side of the heater of the vacuum tube VT–2 to one side of the heater of the third stage vacuum tube VT–3; a conductor 44 extends from the other side of the heater of the vacuum tube VT-3 to one side of the heater of the first vacuum tube VT-4 of the lock-in amplifier; a conductor 45 extends from the other side of the heater of the vacuum tube VT-4 to one side of the heater of the second vacuum tube VT-5 of the lock-in amplifier; a conductor 46 extends from the other side of the heater of the vacuum tube VT-5 to one side of the heater of the vacuum tube VT-6 of the buffer amplifier stage; a conductor 47 extends from the other side of the heater of the vacuum tube VT-6 to one side of the heater of the vacuum tube VT-7 of the meter driving stage; and a conductor 48 extends from the other side of the heater of the vacuum tube VT-7 to the power supply.

The cathode element of the first stage vacuum tube VT-1 is connected to the conductor 20 by a conductor 49, the cathode element of the second stage vacuum tube VT-2 is connected to the conductor 20 by a conductor 50, and the cathode element of the third stage vacuum tube VT-3 is connected to the conductor 20 by a conductor 51. Self-bias resistors R-5, R-6, and R-7 are interposed in the conductors 49, 50, and 51, respectively. Values of 2,500 ohms each for the resistors R-5, R-6, and R-7 have been found satisfactory.

A conductor 52 is connected to the screen grid of the first stage vacuum tube VT-1 and this conductor extends to the power supply. A resistor R-8 is interposed in the conductor 52 adjacent the screen grid of tube VT-1. The screen grids of the second and third stage vacuum tubes VT-2 and VT-3, respectively, are connected to conductor 52 by conductors 53 and 54, respectively. Resistors R-9 and R-10 are interposed in the conductors 53 and 54, respectively. Values of two and a half (2.5) megohms for the resistors R-8, R-9, and R-10 have been found satisfactory.

An A. C. blocking resistor R-11 is interposed in conductor 52 in series with resistor R-8 and anterior to the connection of conductor 53 to conductor 52, and a capacitor C-4 is shunted by a conductor 55 between the conductor 52, intermediate the resistors R-8 and R-9, and the conductor 20 for the purpose of providing a low impedance path for the A. C. component of the plate current to prevent coupling between the several stages of the electrical system. Values of one tenth (0.10) megohm for the resistor R-11 and two (2.0) microfarads for the capacitor C-4 have been found satisfactory.

A conductor 56 is connected at one end to the conductor 49, intermediate the cathode of the first stage vacuum tube VT-1 and the resistor R-5, and at the other end to the conductor 52, intermediate the screen grid of the vacuum tube and the resistor R-8. A capacitor C-5 is interposed in the conductor 56. The suppressor grid of the vacuum tube VT-1 is connected to the conductor 56 by a conductor 57, intermediate the juncture of the conductors 49 and 56 and the capacitor C-5. Similarly, a conductor 58 is connected at one end to the conductor 50, intermediate the cathode of the second stage vacuum tube VT-2 and the resistor R-6, and at the other end to the conductor 53, intermediate the screen grid of the vacuum tube and the resistor R-9. A capacitor C-6 is interposed in the conductor 57. The suppressor grid of the vacuum tube VT-2 is connected to the conductor 58 by a conductor 59, intermediate the juncture of the conductors 50 and 58 and the capacitor C-6. Likewise, a conductor 60 is connected at one end to the conductor 51, intermediate the cathode of the third stage vacuum tube VT-3 and the resistor R-7, and at the other end to the conductor 54, intermediate the screen grid of the vacuum tube and the resistor R-10. A capacitor C-7 is interposed in the conductor 60. The suppressor grid of the vacuum tube VT-3 is connected by a conductor 61 to the conductor 60, intermediate the juncture of the conductors 51 and 60, and the capacitor C-7. A. C. blocking resistors R-8, R-9 and R-10 and their associated bypass condensers C-5, C-6 and C7 respectively are employed to prevent application of the A. C. component of the plate voltage to the screen grids of their associated tubes in accordance with conventional circuit arrangements.

The plate of the first stage vacuum tube VT-1 is connected by a conductor 62 to a coupling capacitor C-8 and thence to the grid of tube VT-2. A grid leak resistor R-12 is interposed in series with the conductor 62 to the conductor 20. A conductor 63 is bridged across the conductor 62, intermediate the plate of the vacuum tube and the coupling capacitor C-8 and the conductor 20. A bypass capacitor C-9 is interposed in this conductor. Likewise, a conductor 64 is bridged across the conductor 62, intermediate the juncture of the conductors 62 and 63 and the capacitor C-8, and the conductor 52. A plate load resistor R-13 is interposed in this conductor. Values of .01 mf. for the capacitor C-8 and .001 mf. for the capacitor C-9, and 1.0 megohm for the resistor R-12 and 0.5 megohm for the resistor R-13 have been found satisfactory.

A conductor 65 extends from conductor 62, intermediate the coupling capacitor C-8 and the resistor R-12, to the control grid of the second stage vacuum tube VT-2.

Similarly, the plate of the second stage vacuum tube VT-2 is connected to conductor 20 by a conductor 66. A coupling capacitor C-10 and a potentiometer or voltage divider R-14 are interposed in series in the conductor 66. A conductor 67 is bridged across the conductor 66, intermediate the plate of the vacuum tube and the coupling capacitor C-10, and the conductor 20. A bypass capacitor C-11 is interposed in the conductor 67. Likewise, a conductor 68 is bridged across the conductor 66, intermediate the juncture of the conductors 66 and 67 and the coupling capacitor C-10, and the conductor 52. A plate load resistor R-15 is interposed in this conductor. Values of .01 mf. for the capacitor C-10 and .001 mf. for the capacitor C-11 and 1 megohm for the potentiometer or voltage divider R-14 and 0.5 megohm for the resistor R-15 have been found satisfactory.

The potentiometer or voltage divider R-14 functions as a gain control to enable the selection of a small variable amount of the output of the second stage to be fed to the grid of the third stage of the A. C. amplifier.

The arm 69 of the potentiometer or voltage divider R-14 is connected by a conductor 70 to the fifth point of a five (5) point switch SW-1 which is employed to select fractional portions of the output of the second stage. The first point of this switch is connected by a conductor 71 to the conductor 20 and may be utilized with the switch in connection therewith for determining the output per stage of the A. C. amplifier. A four (4) section tapped resistor, comprising sections R-16, R-17, R-18, and R-19, is interposed in a conductor 72 which is connected at one end to the conductor 70, intermediate the arm 69 of the potentiometer or voltage divider R-14 and the fifth tap of the switch SW-1, and at the other end to the conductor 20. A conductor 73 is connected to the tap intermediate the resistor sections R-19 and R-18 and to the second tap of the switch SW-1; similarly, a conductor 74 is connected to the tap intermediate the resistor sections R-18 and R-17 and to the third tap of the switch SW-1; likewise, a conductor 75 is connected to the tap intermediate the resistor sections R-17 and R-16 and to the fourth tap of the switch SW-1. Values of 0.75 megohm for the resistor section R-16, 0.175 megohm for the resistor section R-17, 45,000 ohms for the resistor R-18, and 15,000 ohms for the resistor section R-19 have been found satisfactory. The arm 76 of switch SW-1 is connected by a conductor 77 to the control grid of the third stage vacuum tube VT-3.

The lock-in amplifier, to be described in detail later, comprises an amplifier stage and a counterbalancing stage therefor, the vacuum tubes VT-4 and VT-5, respectively, being the principal components of these stages. The vacuum tube designated commercially as the "12SL7," a double triode, has been found satisfactory for the instant purpose.

The plate of the third stage vacuum tube VT-3 is connected by a conductor 78 to the control grids of vacuum tube VT-4 of the lock-in amplifier. A coupling capacitor C-12 is interposed in the conductor 78. A conductor 79 is bridged across the conductor 78, intermediate the plate of the vacuum tube VT-3 and the coupling capacitor C-12, and the conductor 20. A bypass capacitor C-13 is interposed in this conductor. Likewise a conductor 80 is bridged across the conductor 78 intermediate the juncture of the conductors 78 and 79 and the coupling capacitor C-12, and the conductor 52. A plate load resistor R-20 is interposed in the conductor 80. Values of 0.01 mf. for the coupling capacitor C-12, and .008 mf. for the bypass capacitor C-13, and 0.5 megohm for resistor R-20 have been found satisfactory.

The A. C. amplifier is tuned by the coupling capacitors C-8, C-10, and C-12 and by the plate bypass capacitors C-9, C-11, and C-13. The plate bypass capacitors also shift the phase of the signal, so that it will correspond to the phase of the A. C. potential applied to the plate of the lock-in amplifier. The amplifier tuning further serves a double purpose; it reduces the effect of the pick-up "spike" or sharp peaks in the output of the A. C. amplifier due to flow of grid current in the lock-in amplifier while the vibrator of the chopper is floating and reduces the potential on the grids of tubes VT-4 and VT-5 in the lock-in amplifier, thereby reducing the possibility of overloading these tubes. Too sharp tuning of the amplifier however is not desirable since the principal use of the apparatus is on board a vessel where the frequency may vary from 55 to 65 cycles per second.

A pair of voltage dividers comprising resistors R-21, R-23, and R-22, R-24 respectively are interposed between the last stage of the A. C. amplifier and the lock-in amplifier and provide fixed bias potential for tubes VT-4 and VT-5 respectively. A conductor 81 is bridged from conductor 80, intermediate the resistor R-20 and the juncture of the conductors 80 and 52, and the conductor 20. Two resistors, R-23 and R-24, are connected in series and interposed in this conductor. Similarly, two more resistors, R-21 and R-22 are connected in series with each other and in parallel with the resistors R-23 and R-24 by a conductor 82 which is connected to the conductor 81, intermediate the juncture of the conductors 80 and 81 and the resistor R-23 and to the conductor 20. A conductor 83 is connected to the conductor 82, intermediate the resistors R-21 and R-22, and to the conductor 78, intermediate the coupling capacitor C-12 and the control grid of tube VT-4 of the lock-in amplifier. Values of 5 megohms for the resistors R-21 and R-23 and 0.5 megohm for the resistors R-22 and R-24 have been found satisfactory.

The lock-in amplifier comprises two tubes VT-4 and VT-5, only the former, however, being a signal amplifier; the second tube VT-5 counteracts any cathode unbalance produced by an asymmetrical wave emanating from the power supply and appearing on the plates of tube VT-4.

In the use of the apparatus on board vessels, it has been found that an asymmetrical wave in the A. C. power supply may be produced by reason of the use of certain equipment such, for example, as submarine ranging equipment. This wave results from the rotation of the head on the submarine ranging equipment and produces signals on the indicating instrument. Rotation of the head is produced by rectifying either the positive or negative half of the sixty (60) cycle ship's power supply and applying it to a D. C. motor connected to the sound head. Depending on the direction of rotation, either the positive or the negative half of the sixty (60) cycle loop will be diminished in magnitude, thus producing the asymmetrical wave. This wave is applied to the plates of tube VT-4 of the lock-in stage, causing a potential unbalance across the cathode resistors thereof. To eliminate this unbalance the cathode circuits of tube VT-5 are made common with those of tube VT-4 and the plates of the tubes are cross-connected so as to buck any cathode unbalance produced by an asymmetrical wave applied to the plates of these tubes. No signal is applied to the grids of the bucking tube. However, the sections of tube VT-5 conduct alternately and thus produce voltages across the cathode resistors, which voltages compensate for the unbalance produced thereacross.

The signal voltage applied to the grids of VT-4 is not large enough to produce cut-off of the tube. This condition does not give a maximum potential across the cathodes. The potential measured from cathode to cathode will be the difference between the two individual cathode potentials. When both sections of the tube are conducting, an A. C. 120 cycle potential will appear from cathode to cathode thereof. The potentials on the two plates of the tube are always 180 degrees out of phase. The two grids are always at the same phase as the applied signal. As long as the grids have the same polarity as one of the plates, the corresponding tube will conduct. When the phase of the grids is reversed, the other tube will conduct. A D. C. potential may be measured from cathode to cathode if a voltmeter of relatively long period is connected across these points. The polarity of this potential will reverse when the polarity of the signal on the grids is reversed.

The foregoing operations of the lock-in amplifier may be accomplished by the following specific circuit connections:

A resistor R-25 is interposed in the conductor 78 intermediate the coupling capacitor C-12 and the control grid of the right hand section of tube VT-4 as viewed in the drawing, a second resistor R-26 being connected to the other control grid of tube VT-4 by a conductor 84 which is connected to the conductor 78 intermediate the coupling capacitor C-12 and the first resistor R-25. A conductor 85 is connected to the conductor 81, intermediate the resistors R-23 and R-24, and extends to the control grid of the right hand section of tube VT-5 as viewed in the drawing. A resistor R-27 is interposed in this conductor. Similarly a second resistor R-28 is connected to the other control grid of tube VT-5 by a conductor 86 which is connected to the conductor 85, intermediate the juncture of the conductors 81 and 85 and the resistor R-27. Values of 0.5 megohm each for the resistors R-25, R-26, R-27 and R-28 have been found satisfactory.

The plate of the right hand section of tube VT-4 is connected by a conductor 87 to the power supply; similarly, the other plate of tube VT-4 is connected to the power supply by a conductor 88. The plate of the left hand section of tube VT-5 is connected in parallel with the plate of the right hand section of tube VT-4 by a conductor 89 which is connected to the conductor 87; similarly, the other plate of tube VT-5 is connected in parallel with the other plate of tube VT-4 by a conductor 90 which is connected to the conductor 88.

The conductors 31 and 32 from the exciter coil 30 of the chopper CR, the conductors 40 and 48 of the heater power supply circuit, the conductor 52 from the plates and screen grids of the vacuum tubes VT-1, VT-2, and VT-3 of the A. C. amplifier, and the conductors 87 and 88 from the double plates of the two vacuum tubes VT-4 and VT-5 of the lock-in amplifier all extend to a terminal block 91 intermediate the amplifier apparatus and the power supply.

The cathode of the left hand section of tube VT-4 of the lock-in amplifier is connected by a conductor 92 and resistor R-29 to the conductor 20. A conductor 93 is connected to the conductor 92, intermediate the cathode of the first vacuum tube VT-4 and the resistor R-29, and this conductor extends to the control grid of the right hand section of vacuum tube VT-6 of the buffer amplifier stage. The cathode of the left hand section of tube VT-5 is connected in parallel with the cathode of the left hand section of VT-4 by a conductor 94 which is connected to the conductor 93, intermediate the juncture of the conductors 92 and 93 and the aforesaid control grid of the vacuum tube VT-6. The cathode of the right hand section of tube VT-4 is connected by a conductor 95 to the conductor 97. A resistor R-30 is interposed in the conductor 95. Values of 25,000 ohms each for the resistors R-29 and R-30 have been found satisfactory. Similarly, the cathode of the right hand section of tube VT-5 is connected by a conductor 96 to the control grid of the left hand section of tube VT-6 of the buffer amplifier stage. Likewise, the cathode of the right hand section of tube VT-4 of the lock-in amplifier is connected in parallel with the cathode of the right hand section of tube VT-5 by a conductor 97 which is connected to the conductor 95, intermediate the cathode of tube VT-4 and resistor R-30, and to the conductor 96 intermediate the cathode of tube VT-5 and the control grid of the right hand section of tube VT-6.

The lock-in amplifier stage produces a signal of 120-cycle frequency across the cathode resistors R-29 and R-30 when both of the tubes VT-4 and VT-5 are conducting, which signal must be averaged out by a circuit with a sufficiently long time constant. This is accomplished by an R-C filter balanced to ground, this filter being interposed between the lock-in and buffer amplifier stages. Two resistors R-31 and R-33 are connected in series and interposed in the conductor 93, intermediate the juncture of the conductors 93 and 95 and the control grid of the right hand section of tube VT-6. Similarly, two resistors R-32 and R-34 are connected in series and interposed in the conductor 96, intermediate the juncture of the conductors 96 and 97 and the other control grid of tube VT-6. A capacitor C-14 is connected by a conductor 98 across the conductors 93 and 96, intermediate the resistors R-31 and R-33 and R-32 and R-34, respectively. Similarly, a second capacitor C-15 is connected by a conductor 99 across the conductors 93 and 96, intermediate the resistor R-33 and the right hand control grid of tube VT-6 and intermediate the resistor R-34 and the other control grid of tube VT-6, respectively. Two more capacitors C-16 and C-17 are connected in series by a conductor 100; the capacitor C-16 is connected by a conductor 101 to the conductor 93, intermediate the resistor R-31 and the juncture of the conductors 93 and 98, and the capacitor C-17 is connected by a conductor 102 to the conductor 96, intermediate the juncture of the conductors 98 and 96 and the resistor R-34. A grounded conductor 103 is connected at one end to the conductor 100, intermediate the capacitors C-16 and C-17 and at the other end to the conductor 20. The foregoing arrangement of capacitors and the resistances comprises the integrating circuit for the fluxmeter. The time constant of this integrating circuit is long with respect to the period of the incoming signal induced within the detector coils D-1 and D-2, whereby the voltage across the capacitor C-15 is the integral of the applied voltage.

The time constant of the integrating circuit should be such that spurious signals such as may be generated by roll and pitch do not develop an appreciable undesirable potential. This is a requirement that is rather difficult to satisfy for the reason that the signals vary in duration depending on the relative velocities of the vessel and objective and also upon their relative headings.

It is possible to determine the values for the high frequency cut-off and the integration time for optimum discrimination against undesirable background including spurious signals resulting from roll and heading changes of the towing vessel. Unfortunately, since the useful signal frequency does not always have the same period, the amplifier should not be tuned too sharply. For example, it has been assumed that the roll of a vessel would be more or less steady, continuing for a long period of time. Actually the roll is rather irregular and at times one particular roll may have the same characteristics as a submarine or useful signal. The actual tuning of the amplifier may best be accomplished by reproducing actual submarine or useful signals and applying the corresponding potential on the chopper amplifier. For this purpose, a signal generator preferably should be employed.

Values of 1.0 megohm each for the resistors R-31, R-32, R-33, and R-34, 2.0 mf. for the capacitors C-14 and C-15, and 0.5 mf. each for the capacitors C-16 and C-17 have been found satisfactory.

The buffer amplifier stage permits the use of both an integration circuit and a capacity coupling circuit to eliminate the effects of slow drift in the input of the amplifier due to thermal and sea water battery E. M. F.'s applied thereto from the search coils, it being well known that these coils produce such E. M. F.'s under certain conditions of operation as a result of the action of moisture upon two adjoining dissimilar metals, and from other causes. Without this stage, the capacity used in the integration circuit and the capacity coupling would be unnecessarily large, for the reason that these two steps would have to be carried out in the same circuit. It will be understood that the integration could be carried out in the input filter when the resistance of the gradiometer detector coils D-1 and D-2 is sufficiently high; where the resistance of these coils is not sufficiently high, the integration must be done between the lock-in amplifier and the buffer amplifier stages. The vacuum tube designated commercially as the "12SL7," a double cathode, double grid, and double plate tube also has been found satisfactory for this stage.

The buffer amplifier stage thus serves as a convenient isolating point between the integrating and the capacity coupling circuits and consists of a D. C. amplifier which has a large amount of degeneration to increase its stability. The cathode and plate resistors, respectively, of the two sections of this amplifier are precision resistors, because, in case of line potential surges, the potential from grid to cathode in the lock-in stage will suddenly change. As a result, the two grids of the buffer amplifier stage will change potential with respect to the cathodes by a proportionate amount. If the circuit constants in the two stages of the buffer amplifier are not identical, the potentials developed across the plate resistors will not be either. This condition will produce a signal in the meter driving stage. The use of precision resistors minimizes the effect of line potential surges.

The cathodes of the vacuum tube VT-6 of the buffer amplifier stage are connected by way of resistors R-35 and R-36, conductors 104 and 105 respectively to conductor 20. Values of 25,000 ohms each for the resistors R-35 and R-36 have been found satisfactory. The plate of the left hand section of tube VT-6 is connected by a conductor 106 to the plate of the right hand section of vacuum tube VT-7 of the meter driving stage, a resistor R-37 being interposed in conductor 106. The other plate of the vacuum tube VT-6 is connected to the first plate thereof by the conductors 107 and 106, a resistor R-38 being interposed in the conductor 107. Values of 0.1 megohm each have been found satisfactory for the resistors R-37 and R-38. Both plates of tube VT-7 are connected in parallel by a conductor 108 which is connected to the conductor 106, intermediate the juncture of the conductors 106 and 107 and the first plate of the vacuum tube. A conductor 109 is connected at one end to the conductor 106, intermediate the junctures of the conductors 106 and 107 and the conductors 106 and 108, respectively, and at the other end to the conductor 52, thereby to apply plate potential to tubes VT-6 and VT-7.

The meter driving stage consists of a cathode follower circuit, which provides a convenient expedient of obtaining a low impedance coupling circuit between the output of the amplifier and the indicating instrument. Since the cathode follower circuit has a high degree of degeneration, no difficulty is encountered in drift or unbalance. The vacuum tube designated commercially as the "12SL7" has been found satisfactory for this stage.

Two resistors R-39 and R-40 are connected in series and interposed in a conductor 110 which is connected at one end to the conductor 108, and at the other end to the conductor 20. These resistors comprise a voltage divider network for supplying fixed bias potential to the grids of tube VT-7. A conductor 111 is connected to the conductor 110, intermediate the resistors R-39 and R-40 and extends to the control grid of the left hand section of tube VT-7. A resistor R-41 is interposed in the conductor 111. A conductor 112 is connected at one end to the conductor 111, at the juncture of the latter with the aforesaid control grid of tube VT-7, and at the other end to the conductor 106. A coupling capacitor C-18 is interposed in the conductor 112 and serves to apply the signal voltage at the plate of the left hand section of tube VT-6 to the aforesaid control grid of tube VT-7. A conductor 113 is connected at one end to the conductor 111, intermediate the juncture of the latter with the conductor 110 and the resistor R-41, and this conductor extends to the other control grid of tube VT-7. A resistor R-42 is interposed in the conductor 113. A conductor 114 is connected at one end to the conductor 113, intermediate the resistor R-42 and the control grid of the right hand section of tube VT-7, and at the other end to the conductor 107, intermediate the plate of the vacuum tube VT-6 and the resistor R-38. A coupling capacitor C-19 is interposed in the conductor 114 and serves to apply the signal voltage at the plate of the right hand section of tube VT-6 to the control grid of the right hand section of tube VT-7. Values of 0.5 megohm each for the resistors R-39 and R-40 and 2.0 megohms each for the resistors R-41 and R-42, and 4.0 mf. each for the capacitors C-18 and C-19 have been found satisfactory.

Since the periods of the signals produced and of background caused by heading changes and the vessel's roll are widely separated in some cases, it is possible to tune the capacity coupling stage including capacitors C-18 and C-19 to discriminate against undesirable background effects. Heading changes produce a spurious signal of relatively low frequency, sometimes the transition through a complete circle requiring 120 seconds, so a capacity coupling stage can be used to discriminate against this spurious signal. An eight (8) second time constant for the capacity coupling stage has been found satisfactory for a system which produces a complete heading change in 120 seconds, a roll cycle in five (5) seconds, and a fifteen (15) second signal.

Since the roll usually has a much higher frequency than the signal, the amplifier can include a circuit which will cut off at a frequency somewhat lower than the roll. This cut-off feature can be accomplished by a conventional resistance-capacity filter.

The time constants of the capacity coupling circuit, including capacitors C-18 and C-19, between the buffer-amplifier and the meter driving stages must be identical. The reason for this involves effects produced by potential surges in the A. C. supply line. Assuming that the buffer-amplifier stage is balanced and the line potential surge appears, both plates of the buffer-amplifier stage will rise or fall in proportion, the polarity of the plates depending on the polarity of the surge. Should the time constants of the coupling circuit differ, the potentials on the grids of the meter driving stage will not vary simultaneously and a signal will be produced on the indicating instrument.

One cathode of the vacuum tube VT-7 of the meter driving stage is connected by a conductor 115 to the conductor 20 and the other cathode is connected by a conductor 116 to the conductor 20. Resistors R-43 and R-44 are interposed in the conductors 115 and 116, respectively. A value of 0.1 megohm each for the resistors R-43 and R-44 has been found satisfactory.

The recorder RO is preferably one of the well known commercial devices which rules a graphic line on previously prepared cross-section paper passing through the recorder. It is connected by conductors 117 and 118 to the conductors 115 and 116, respectively, the conductor 117 being connected to the conductor 115 intermediate the resistor R-43 and one cathode of the vacuum tube VT-7 of the meter driving stage, and the conductor 118 being connected to the conductor 116 intermediate the resistor R-44 and the other cathode of tube VT-7. A resistor R-45 is interposed in conductor 117. A value of 200 ohms has been found satisfactory for the resistor R-45. Since capacity coupling is incorporated between the output of the amplifier and the meter driving stage, a double pole, double throw switch SW-2 is provided for connecting at will the indicating instrument to the lock-in amplifier stage. One set of contacts of the switch SW-2 is connected by conductors 119 and 120 in shunt relationship around the resistor R-45. A microammeter M-1 with 50-0-50 scale is connected by conductors 121 and 122 to the blades of the switch SW-2. The other set of contacts of the switch SW-2 is connected by conductors 123 and 124 to the output of the lock-in amplifier stage, conductor 123 being connected to the conductor 93 anterior to the resistor R-31 of the filter and the conductor 124 being connected to the conductor 96 anterior to the resistor R-32. A resistor R-46 is interposed in the conductor 124. A value of 25,000 ohms has been found satisfactory for the resistor R-46.

The aforementioned capacity coupling also prevents the aforementioned battery E. M. F.'s from affecting the flux measuring device, since these E. M. F.'s are substantially direct current potentials. Precautions should be exercised to insure that the direct current potentials in the detector coils and in the input circuit of the A.-C. amplifier are not large enough to block the grid of the tube VT-1, or large enough to cause subsequent potentials sufficient to block any of the following stages.

The power supply has for its principal component a transformer T-1. This transformer has a primary winding P, a core LM, and five (5) secondary windings, S-1, S-2, S-3, S-4, and S-5. The primary winding P is connected by conductors 125 and 126 to a plug 127, which latter is adapted to be connected to a source of 110-120 volt, 60 cycle, alternating current on board a vessel. A double pole, single throw switch SW-3 is interposed in the conductors 125 and 126. A protective fuse F-1 is also interposed in the conductor 125.

The secondary winding S-1 supplies the current for the exciter coil 30 of the chopper CR, the conductors 31 and 32 being connected to this winding. A pilot light SL is connected by a conductor 128 across the conductors 31 and 32, this light serving to indicate when the transformer T-1 is energized. The secondary windings S-2, S-3, S-4, and S-5 each have center taps. The center taps of the windings S-3 and S-4 are connected by a conductor 136. The conductor 40, forming one side of the heater supply circuit for the vacuum tubes VT-1 to VT-7, inclusive, is also connected to the conductor 136. A potentiometer or voltage divider R-47 is shunted across the conductors 31 and 32, by a conductor 129. The arm 130 of the voltage divider R-47 is connected by a conductor 131 to the conductor 40. It will be recalled that the latter conductor is grounded at 38. A value of 100 ohms has been found satisfactory for the voltage divider R-47. This voltage divider is adjustable to control the position of the electrical neutral connection with respect to the driving coil 30 of the chopper, thereby to minimize the effects of electrostatic coupling between the vibrating reed 24 and the coil 30 and reduce to a minimum the voltage peaks developed during the transit time between the contacts 27 and the contacts 26 and 28.

The secondary winding S-2 supplies the current for operating a rectifier vacuum tube VT-8, this winding being connected to the filament of this tube by conductors 132 and 134. The vacuum tube designated commercially as the "5U4G," a full wave, high vacuum rectifier tube has been found satisfactory for the instant purpose.

The secondary winding S-3 is connected to the plates of the vacuum tube VT-8 by conductors 135 and 137.

The secondary winding S-4 supplies the plate current for the vacuum tubes VT-4 and VT-5 of the lock-in amplifier stage, the conductors 87 and 88 being connected to this winding.

The secondary winding S-5 supplies the heater current for a pair of power amplifier vacuum tubes VT-9 and VT-10, this winding being connected to the heater of the vacuum tube VT-9 by conductors 138 and 140; the heater of the vacuum tube VT-10 is connected in parallel with the heater of the vacuum tube VT-9 by conductors 141 and 142, which are connected to the conductors 138 and 140 respectively. A resistor R-48 is interposed in the conductor 138. A value of 0.5 ohm has been found satisfactory for the resistor R-48. A conductor 139 is connected at one end to the center tap of the secondary winding S-5 and at the other end to the cathode of the vacuum tube VT-9; the cathode of the vacuum tube VT-10 is connected in parallel with the cathode of the vacuum tube VT-9 by a conductor 143, which is connected to the conductor 139. The vacuum tube designated commercially as the "6L6" has been found satisfactory for the instant purpose. This is a metal encased power amplifier vacuum tube. The metal casing of each tube is grounded at 144. The control grids of the vacuum tubes VT-9 and VT-10 are connected by a conductor 145 having a resistor R-49 interposed therein. A value of 20,000 ohms has been found satisfactory for the resistor R-49. The screen grid of the vacuum tube VT-10 is connected by a conductor 146 to the arm 154 of a potentiometer or voltage divider R-52, to be later described. A resistor R-50 is interposed in the conductor 146. A value of 1.0 megohm has been found satisfactory for the resistor R-50. The plate of the vacuum tube VT-10 is connected in parallel with the screen grid of this tube by a conductor 147, which is connected to the conductor 146. The screen grid of the vacuum tube VT-9 is connected in parallel with the screen grid of the vacuum tube VT-10 by a conductor 148, which is connected to the conductor 146 anterior to the resistor R-50. The plate of the vacuum tube VT-9 is likewise connected in parallel with the screen grid of this tube by a conductor 149, which is connected to the conductor 146, also anterior to the resistor R-50.

A conductor 133 is connected at one end to the center tap of the secondary winding S-2 and at the other end to the conductor 146, intermediate the junctures of the latter with the screen grid and cathode conductors 148 and 149, respectively, of the tube VT-9. A filter is interposed between the secondary windings S-2 and S-3 of the transformer T-1 and the power amplifier tubes VT-9 and VT-10. This filter comprises two choke coils L-1 and L-2 and two capacitors C-20 and C-21. The choke coils L-1 and L-2 are connected in series and interposed in the conductor 133; the capacitor C-20 is bridged by a conductor 150 between the conductor 133, intermediate the choke coils L-1 and L-2, and the conductor 40; and the capacitor C-21 is bridged by a conductor 151 between the conductor 133, intermediate the choke coil L-2 and the juncture of the conductors 133 and 146, and the conductor 40. The choke coils L-1 and L-2 are preferably standard commercial devices and a value of 8 mf. each for the capacitors C-20 and C-21 has been found satisfactory.

The heater supply conductor 48 for the vacuum tubes VT-1 to VT-7, inclusive, is connected to one side of the heater of a vacuum tube VT-12, the heater of this vacuum tube thus being in series with the heaters of the first seven vacuum tubes. The other side of the heater of tube VT-12 is connected by a conductor 152 to the conductor 139, intermediate the connections of the cathodes of the power amplifier tubes VT-9 and VT-10 to this conductor. The voltage reducing resistor R-51 is interposed in the conductor 152. A value of 1,000 ohms for the resistor R-51 has been found satisfactory. The vacuum tube designated commercially as the "12SF5," a high-mu triode tube, has been found satisfactory for the instant purpose.

The plate supply conductor 52 is connected to the conductor 152, intermediate the resistor R-51 and the juncture of the conductors 152 and 139. Two potentiometers or voltage dividers R-52 and R-54 and two fixed resistors R-53 and R-55, comprising a voltage divider network, are connected in series and interposed in a conductor 153, which is connected at one end to the conductor 152, intermediate the junctures of the conductors 152 and 52 and 152 and 139, and at the other end to the conductor 40. As previously stated, the conductor 146 from the screen grids of the power amplifier vacuum tubes VT-9 and VT-10 is connected to the arm 154 of the voltage divider R-52. The control grid of the vacuum tube VT-12 is connected by a conductor 155 to the arm 156 of the voltage divider R-54. Values of 10,000 ohms for the voltage divider R-52, 50,000 ohms for the fixed resistor R-53, 20,000 ohms for the voltage divider R-54, and 0.10 megohm for the fixed resistor R-55 have been found satisfactory.

The plate of tube VT-12 is connected by a conductor 157 to conductor 146, intermediate the resistor R-50 and the plates of the power amplifier tubes VT-9 and VT-10. A resistor R-56 is interposed in conductor 157. A value of 0.5 megohm for the resistor R-56 has been found satisfactory. A conductor 158 is connected at one end to the conductor 157, intermediate the resistor R-56 and the plate of the vacuum tube VT-12, and at the other end to conductor 145, intermediate resistor R-49 and the control grid of the power amplifier tube VT-10.

A load resistor R-57 in the plate circuit of regulator tube VT-11 and a capacitor C-22 for the cathode of tube VT-12 are connected in series and interposed in a conductor 159 which is connected at one end to the conductor 152, intermediate the junctures of the conductors 152 and 153 and 152 and 139. Values of 15,000 ohms for the resistor R-57 and 0.10 mf. for the capacitor C-22 have been found satisfactory. The cathode of the vacuum tube VT-12 is connected by a conductor 160 to the conductor 159, intermediate the resistor R-57 and the capacitor C-22.

Voltage regulator tube VT-11 is of the gaseous discharge type and may be of any commercial type suitable for the purpose. The cathode of this tube is connected by a conductor 161 to the conductor 40. The plate of the tube is connected by a conductor 162 to the conductor 159, intermediate the resistor R-57 and the juncture of the conductors 159 and 160.

A variable resistor R-58 and a fixed resistor R-59 comprise a shunt path for tubes VT-9 and VT-10 and for this purpose are connected in series and interposed in a conductor 163 which is connected at one end to the conductor 146, intermediate the juncture of the conductors 146 and 157 and the plates of the power amplifier tubes VT-9 and VT-10, and at the other end to the conductor 152, intermediate the junctures of the conductors 152 and 159 and 152 and 139. A value of 1,000 ohms each for the variable resistor R-58 and the fixed resistor R-59 has been found satisfactory.

The electronic regulator employed in the power supply and comprising tubes VT-9, VT-10, VT-11, and VT-12 and associated components, is of the conventional feedback type. The bias for the amplifier tubes is set by the voltage divider R-54. Since the total current need not be regulated, the regulator vacuum tubes VT-9 and VT-10 are connected in parallel with the variable and fixed resistors R-58 and R-59, respectively, which resistors carry the largest percentage of the heater and plate currents. To set the point at which the regulator will operate, it is necessary to vary the resistor R-58. By means of this parallel resistor and the bias control voltage divider R-54, the system can be set so that it will regulate at the desired potential, which may be a value such, for example, as 246 volts. Minimizing the effects of A. C. line potential fluctuations, involves use of the feedback scheme which is controlled by the voltage divider R-52. This voltage divider makes it possible to control the range of variation of voltage over which the power supply will regulate. The regulator will operate satisfactorily for line potential variations of from 105 to 135 volts. This range should be adequate to take care of the normal potential fluctuations likely to be encountered on board a vessel.

The operation of the chopper and amplifier of the present invention should be apparent from the preceding description. It may, however, be briefly summaried as follows: The gradiometer detector coils D-1 and D-2 are arranged in spaced relationship on a vessel or enclosed by the end caps of a supporting tube (not shown) which tube is towed through the water by the vessel, as the case may be, the chopper CR being continuously excited from the alternating current power supply. As the gradiometer detector coils traverse the earth's magnetic field, which is quite uniform for a given area, the electromotive forces induced in the differentially wound gradiometer detector coils will be equal and will counterbalance each other and there will be no signal applied to either the input filter circuit or the coupling circuit. However, should the gradiometer detector coils pass in the vicinity of a submerged metallic mass, such as a depth charge, submarine, torpedo, or a mine, the earth's magnetic field being distorted in this vicinity, there would be induced in the gradiometer detector coils D-1 and D-2 electromotive forces of different magnitudes and thus the two coils would become unbalanced.

The difference in the electromotive forces induced in the gradiameter detector coils D-1 and D-2 will cause a current to flow through the input filter circuit comprising the capacitors C-1 and C-2 and the resistors R-1 and R-2. This filter discriminates against alternating potentials above the useful signal frequency such, for example, as 60 cycle pickup. It is rather difficult to obtain high discrimination at frequencies very close to the useful signal frequency. Up to the present time, however, it has been found that undesirable pickup near the useful signal frequency has not been large enough to cause trouble.

The current resulting from the unbalanced electromotive forces induced in the gradiometer detector coils D-1 and D-2 will rise slowly to a maximum as these coils pass into the portion of the magnetic field of greatest distortion and then decay as the coils pass out of the distorted magnetic field and into the uniform earth's field surrounding the instant area. The chopper CR breaks up the low frequency useful signal voltage as well as any spurious signal voltages developed in the gradiometer detector coils D-1 and D-2 into a pulsating electromotive force which is transmitted by the resistance-capacity coupling circuit comprised of the resistors R-3 and R-4 and the capacitor C-3, to the amplifier.

The input impedance for the chopper amplifier preferably is 1 megohm. The resistance from grid to ground of the first stage of the amplifier is 0.5 megohm. Since the chopper is only connected to the grid of the first stage vacuum tube forty-eight per cent (48%) of the time, the effective input impedance of the amplifier without the input filter is 1 megohm. Because of the capacitors C-1 and C-2 being connected across the gradiometer detector coils D-1 and D-2 in the input filter, the capacitative reactance of the input filter is in parallel with the 1 megohm input impedance. The frequency of the measured signal will determine the value of this capacitative reactance.

The grid of the first stage vacuum tube VT-1 of the A.-C. amplifier has a rather low impedance to ground because of the rather large coupling capacitor C-3. Since the vibrator 24 of the chopper is connected ninety-six per cent (96%) of the time either to ground or to ground through the 8 mf. capacitor C-3, the grid impedance will be effectively reduced to that of the coupling capacitor. When the vibrator is floating, four per cent (4%) of the period, the grid has a 0.5 megohm impedance to ground through the resistor R-3. The grid will pick up sixty (60) cycles and the tube noise will also be increased during this part of the signal. As a result, the aforementioned "spike" of rather large amplitude will be superimposed on the chopper wave form. This "spike" is eliminated in the manner described in the foregoing.

The fact that the vibrator 24 of the chopper CR is permitted to float for a predetermined interval prevents the last capacitor C-3 in the input filter from being shorted to ground.

The A.-C. amplifier operates generally in much the same manner as any audio frequency amplifier. However, in order to stabilize the amplification, a small amount of degeneration is applied by eliminating the usual cathode bypass capacitors on each amplifier stage. Since the three stage pentode amplifier provides sufficient gain, the loss of gain from the degeneration can be tolerated. The microphonics and the tube noises which produce potential on the grids of tube VT-4 in the lock-in stage will still be present in the amplifier. However, tuning of the A.-C. amplifier, as stated hereinbefore, will reduce this potential.

The amplified A.-C. signal voltage appearing at the output of the A.-C. amplifier is applied simultaneously by way of condenser C-12 to the two grids of tube VT-4 of the lock-in stage. When the signal voltage is of such polarity as to be in phase with the voltage applied to the plate of one of the sections of tube VT-4, the left hand section for example, a potential is developed across the cathode resistor R-29 individual thereto. In the event that the voltage applied to the plates of the lock-in tube is asymmetrical a voltage also is developed across the cathode resistor R-30 individual to the other section of tube VT-4 by reason of the current flowing through the right hand section of tube VT-5. Thus, the true value of the signal voltage appears between the cathodes of tube VT-4, the excess voltage which is produced across resistor R-29 due to asymmetry being exactly equal to that produced across resistor R-30. Similarly, when the signal voltage is of opposite polarity, the signal voltage on the grid of the other section of tube VT-4 is in phase with the voltage applied to the plate thereof and a voltage is developed across the cathode resistor R-30 individual to this section, a voltage drop appearing across cathode resistor R-29 in accordance with the degree of asymmetry and due to the current which flows through the left hand section of tube VT-5. Thus, the true value of the signal voltage invariably is caused to appear for both stages of the push-pull operation of tube VT-4.

By reason of the in-phase relationship of the signal voltage applied to the grids of tube VT-4 and either one of the voltages appearing at the plates thereof, thus providing the lock-in phase function or polarity discrimination of the lock-in amplifier, the lock-in amplifier also serves to discriminate sharply against microphonics and tube noises which are of different frequencies than the signal.

The 120 cycle frequency appearing between the cathodes of tube VT-4 is bypassed to ground by way of filter R-31, C-16 and filter R-32, C-17 associated with the left and right hand sections of tube VT-4, respectively. The useful low frequency signal, however, passes through the integrating circuit comprising condenser C-14 and resistor R-33 and condenser C-15 in cascade therewith, a potential being developed across capacitor C-15, which potential is the integral of the detected signal. The integrating circuit is selected of such values so as to discriminate against background effects including spurious signals and spurious components of the amplified A.-C. voltage resulting from roll and changes of heading of the towing vessel.

The voltage appearing across condenser C-15 is amplified by the push-pull sections of D.-C.

amplifier tube VT-6, the amplified signal voltages appearing at the plates thereof being applied respectively by way of coupling condensers C-18 and C-19 to the control grids of the push-pull meter driving tube VT-7. The output voltage of the meter driving tube appearing across the cathodes thereof drives the recorder RO in a conventional manner, thus providing a record of the signals detected by search coils D-1 and D-2.

Capacitors C-18 and C-19 comprise filter circuits having time constants sufficient to filter any components present in the signal voltage due to the presence of thermal or sea battery effects in the search coils whereby drift of the recorder otherwise resulting therefrom is substantially eliminated.

Whereas in the foregoing, a circuit for detecting and recording signals due to the distortion of the magnetic field within the vicinity of the search coils and caused by the presence of a metallic mass therein has been described in particularity with reference to specific values of circuit parameters, it will be apparent to those skilled in the art to which the invention appertains that the same is readily susceptible of various additional circuit arrangements and electrical embodiments which may be employed for divergent applications and adaptations of the invention. Accordingly, it is the full purpose and intention herein to cover the entire range of equivalents of the preferred embodiment of the invention commensurate with the spirit and scope thereof as defined by the appended claims.

The invention herein described and claimed may be manufactured and used by or for the Government of the United States of America for governmental purposes without the payment of any royalties thereon or therefor.

What is claimed as new and desired to be secured by Letters Patent of the United States is:

1. In an apparatus for detecting submerged metallic masses including means adapted to be towed within the water by a vessel for generating low frequency signals variably in accordance with the degree of distortion of a magnetic field due to the presence of metallic masses within the vicinity thereof, the combination of means for converting the low frequency signals to high frequency A. C. voltages, an A. C. amplifier for amplifying the A. C. voltages to provide an amplified signal therefrom, a lock-in stage operatively connected to said amplifier and having a pair of grid controlled sections for detecting the polarity of the amplified signal, means including a source of A. C. potential for operating the sections of the lock-in stage push-pull, means included within the A. C. amplifier for tuning the frequency of the amplifier such that the amplified signal is locked in phase with the A. C. potential applied to either of the lock-in sections selectively in accordance with the instantaneous polarity of the signal applied to the grids thereof, an R-C integrating-circuit operatively connected to the output of the lock-in stage having a time constant sufficient to exclude components in the amplified signal due to roll and changes in heading of the towing vessel detected by the generator and adapted to develop a voltage which is the integral of the detected signal components due to said metallic masses, and means responsive to said voltage for producing a record of the last named signal components.

2. In a detecting apparatus of the character disclosed including means adapted to be towed within the water by a vessel for generating low frequency signals variably in accordance with the degree of distortion of a magnetic field due to the presence of a metallic mass within the vicinity thereof, an A. C. vacuum tube amplifier, means for chopping and applying said signal to the A. C. amplifier in such a manner that the signal is adapted to be amplified thereby, a push-pull vacuum tube stage operatively connected to said A. C. amplifier for detecting the polarity of the amplified signal, a source of A. C. potential for operating the push-pull stage, means including a push-pull vacuum tube stage operatively connected to said polarity detecting stage and adapted to compensate for unbalance in the output of the push-pull stage due to asymmetry of said A. C. source, an integrating circuit controlled by the output of the polarity detecting push-pull stage having a time constant sufficient to filter out components of the amplified A. C. signal due to roll and changes in heading of the towing vessel and adapted to develop a voltage which is the integral of the detected signal components due to said detected mass, and means responsive to said voltage for producing a record of the said last named signal components.

3. In a detecting apparatus of the character disclosed including means for generating low frequency signals variably in accordance with the degree of distortion of a magnetic field due to the presence of a metallic mass therein and adapted to be towed within the water by a vessel, the combination of means for amplifying said signal, a push-pull vacuum tube stage operatively connected to said amplifying means for detecting the polarity of the amplified signal, an R-C integrating circuit responsive to the output of said push-pull stage and adapted to develop a voltage which is the integral of the detected signal and has an instantaneous polarity corresponding thereto, said R-C integrating circuit having a time constant sufficient to prevent passage therethrough of voltage components in the detected signal due to roll and changes in heading of the towing vessel, a D. C. push-pull amplifier stage responsive to variations in the amplitude and polarity of said voltage, means responsive to the output of said D. C. amplifier stage for producing a record of the detected signal, and an R-C coupling circuit interposed between said D. C. amplifier stage and said recording means and adapted to filter emfs in the signal due to thermal and sea battery effects produced by the signal generating means.

4. In a detecting apparatus of the character disclosed including means for generating low frequency signals variably in accordance with the degree of distortion of a magnetic field due to the presence of a metallic mass therein, the combination of means for amplifying said signal, a push-pull vacuum tube stage operatively connected to said amplifying means for detecting the polarity of the amplified signal, an R-C integrating circuit responsive to the output of said push-pull stage for discriminating against background signals detected by said generating means and having amplitude-time functions differing from those of the desired signal to be detected, said circuit having an R-C time constant sufficient to develop a voltage which is the integral of the detected signal and has an instantaneous polarity corresponding thereto, means responsive to variations in said voltage for producing a record of the detected signal, and an R-C coupling circuit interposed between said integrating circuit and said recording means for filtering emfs in said developed voltage due to thermal and sea battery effects produced by the signal generating means.

5. In an apparatus for amplifying small and slowly varying signals the combination of a chopper having an exciter coil, a floating vibrator, and dual input contacts, said vibrator having a float time not to exceed four per cent (4%) of the period, means for energizing said exciter coil, an input filter coupled to said chopper and including a condenser shunted across the input contacts of said chopper, an A. C. vacuum tube amplifier, a π type capacity-resistance coupling circuit comprising a pair of shunt resistors and a series capacitor connected across the input circuit of said amplifier and the output circuit of said chopper whereby the slowly varying signals are converted into A. C. in the amplifier without substantially decreasing the input impedance of the A. C. amplifier.

6. In an apparatus for amplifying small and slowly varying signals the combination of a chopper having an exciter coil, a floating vibrator, and dual input contacts, one of said input contacts being grounded, said vibrator having a float time not to exceed four per cent (4%) of the period, means for energizing said exciter coil, an input filter including a condenser shunted across said input contacts, an A. C. vacuum tube amplifier including plate by-pass condensers for lowering the amplifier pass band below the frequencies of the electrical pick-up introduced during vibrator float time, a blocking capacitor in series with the vibrator of the chopper and the input grid of the amplifier, a resistor shunting the vibrator and the grounded input contact, and a second resistor shunting the input grid and said grounded input contact whereby the slowly varying signals are converted into A. C. in the amplifier without substantially decreasing the input impedance of the A. C. amplifier.

7. In an apparatus for amplifying small and slowly varying signals, the combination of a chopper having dual input contacts, one of said contacts being grounded, a vibrator and an exciter coil surrounding said vibrator, means connecting said vibrator to ground, a source of alternating electromotive force for energizing said exciter coil, connections from said source of alternating electromotive force to said exciter coil, and means for minimizing electrostatic pick-up between said vibrator and said exciter coil thereby to prevent distortion of said A. C. voltage thereby, said last named means comprising a voltage divider across said connections from the source of electromotive force to the exciter coil, and a connection from the arm of said voltage divider to ground.

8. In an apparatus for amplifying small substantially D. C. signals, the combination of an A. C. vacuum tube amplifier, a chopper coupled to the A. C. amplifier for converting said D. C. signals to A. C. signals, a lock-in dual vacuum tube amplifier stage including an A. C. power supply therefor and responsive to the amplified A. C. signals, and a counter-balancing dual vacuum tube stage operatively connected to said lock-in stage for balancing asymmetrical potentials developed in the power supply and applied to the plates of the lock-in amplifier whereby unbalance of its cathode potentials due to the asymmetrical plate potentials is invariably eliminated from said amplified A. C. signals.

9. In an apparatus for amplifying small substantially D. C. signals, the combination of an A. C. vacuum tube amplifier, a chopper coupled to the A. C. amplifier for converting said D. C. signals to A. C. signals, a lock-in amplifier comprising an amplifier stage having a double triode vacuum tube, a power supply for supplying heater and plate currents to the vacuum tubes of the amplifiers, means for counter-balancing asymmetrical potentials developed in the power supply whereby unbalance of the cathode potentials of the double triode due to asymmetrical plate potentials thereon is eliminated from said amplified A. C. signals, said means comprising a counter-balancing stage for the lock-in amplifier and including a double triode vacuum tube, the plates of said double triode vacuum tubes being respectively cross connected, the respective cathodes of the two vacuum tubes being connected in parallel, and the grids of said lock-in and counter-balancing vacuum tubes being connected to said A. C. amplifier and responsive to different levels of the amplified A. C. signals, a ground connection for the power supply, and a resistor connected intermediate each cathode of the first vacuum tube and the ground connection.

10. In an apparatus for amplifying small signals of slowly varying amplitude having a substantially constant D. C. component, the combination of an amplifier comprising a multi-stage A. C. vacuum tube amplifier, a lock-in amplifier and asymmetry balancing stage operatively connected to the output of the A. C. amplifier, a buffer amplifier stage operatively connected to the output of said lock-in amplifier, and a meter driving stage operatively connected to the output of said buffer stage, a chopper connected to the A. C. amplifier for converting said D. C. signals to A. C. signals, a recorder connected to the meter driving stage, and means for eliminating the D. C. components of the signal, said means comprising a resistance-capacity filter intermediate the buffer amplifier stage and the meter driving stage.

11. In an apparatus for amplifying small signals of slowly varying amplitude having a substantially constant D. C. component, the combination of a chopper, an input filter connected to the chopper, an amplifier connected to the chopper and comprising a multi-stage A. C. amplifier, a lock-in stage, a resistance capacity coupled buffer amplifier and meter driving stage operatively connected in series in the order named, an integrating circuit connected intermediate the lock-in and buffer amplifier stages, an indicating instrument connected to the meter driving stage, and means for detecting the D. C. component of said signals in the input filter, said means comprising a circuit for selectively connecting the indicating instrument intermediate the lock-in amplifier stage and the integrating circuit.

12. In an apparatus for amplifying small and slowly varying signals, a chopper having an exciter coil, a floating vibrator, and dual input contacts, an impedance matching input filter including a capacitor shunted across said input contacts, said vibrator being disengageable from one of said contacts before engaging the other of said contacts, a resistance-capacity coupled amplifier connected to said vibrator and including plate by-pass condensers for lowering the amplifier pass band below the frequencies of the spurious signals introduced in the vibrator by electrical coupling with the coil when the vibrator is floating between the contacts, and a polarity distinguishing circuit coupled to the output of said amplifier for indicating the polarity of said signals.

13. In an apparatus for amplifying small and slowly varying signals, a chopper having an exciter coil, a floating vibrator and dual input contacts, an impedance matching input filter including a capacitor shunted across said input contacts, said vibrator being disengageable from one of said contacts before engaging the other of said contacts, a resistance-capacity coupled amplifier coupled to said vibrator and including plate by-pass phase shifting capacitors for by-passing the spurious signals introduced in the vibrator when the latter is floating between said contacts, a polarity distinguishing lock-in dual vacuum tube amplifier stage having the control grids thereof coupled to said amplifier and in phase with each other, A. C. power means for energizing the plates of said lock-in amplifier stage 180° out of phase and for energizing said exciter coil, and an integrating circuit coupled to the output of said lock-in stage and adapted to develop a voltage which is the integral of the signal input to said chopper.

14. In an apparatus for amplifying small signals of slowly varying amplitude, the combination of means for converting the signals into an A. C. voltage of a predetermined frequency and which varies in amplitude in accordance with the amplitude variations of said signals, means for amplifying said A. C. voltage, a lock-in stage operatively connected to said amplifier and having a pair of grid controlled sections for detecting the polarity of the amplified signal, means including a source of A. C. potential for operating said sections in opposing phase relation to each other, means included with the amplifier for tuning the phase shift of the amplifier so that the amplified signal applied to said sections is locked in phase with the A. C. potential applied to either of the lock-in sections selectively in accordance with the instantaneous polarity of the signal applied to the grids thereof, and an integrating circuit operatively connected to the output of the lock-in stage and adapted to develop a voltage which is the integral of the detected signal.

15. In an apparatus for amplifying small signals of slowly varying applitude, the combination of means for converting the signals into an A. C. voltage of predetermined frequency and which varies in amplitude in accordance with the amplitude variations of said signals, means for amplifying said A. C. voltage, a lock-in stage operatively connected to said amplifier and having a pair of grid controlled sections for detecting the polarity of the amplified signal, means including a source of A. C. potential for operating said sections in push-pull, means included within said amplifier for tuning the phase shift of the amplifier such that the amplified signal is in phase with the A. C. potential applied to either of the lock-in sections selectively in accordance with the instantaneous polarity of the signal applied to the grids thereof, means including a push-pull vacuum stage operatively connected to said lock-in stage and responsive to said source of A. C. potential and adapted to compensate for unbalance in the output of the lock-in amplifier due to asymmetry of said A. C. source, and an integrating circuit operatively connected to the output of the lock-in stage and adapted to develop a voltage which is the integral of the detected signal.

16. The combination of claim 13 including a voltage divider connected across said exciter coil, and a variable tap on said voltage divider, and impedance means interconnecting said vibrator and said tap for minimizing the electrostatic pick-up between the vibrator and the exciter coil during the vibrator float time.

GILBERT J. PERLOW.
ERNEST R. HABERLAND.

REFERENCES CITED

The following references are of record in the file of this patent:

UNITED STATES PATENTS

| Number | Name | Date |
|---|---|---|
| 1,184,233 | Giglio | May 23, 1916 |
| 2,113,164 | Williams | Apr. 5, 1938 |
| 2,191,315 | Guanella | Feb. 20, 1940 |
| 2,226,238 | Doba | Dec. 24, 1940 |
| 2,238,072 | Nelson | Apr. 15, 1941 |
| 2,291,692 | Cloud | Aug. 4, 1942 |
| 2,359,894 | Brown | Oct. 10, 1944 |
| 2,367,746 | Williams, Jr. | Jan. 23, 1945 |
| 2,374,166 | Beach | Apr. 24, 1945 |
| 2,375,811 | Nelson | May 15, 1945 |
| 2,404,806 | Lindsey | July 30, 1946 |
| 2,459,730 | Williams, Jr. | Jan. 18, 1949 |
| 2,485,948 | Williams, Jr., et al. | Oct. 25, 1949 |
| 2,519,094 | Zuschlag | Aug. 15, 1950 |